Dec. 4, 1934.  C. C. DUNBAR  1,983,350
SLED CULTIVATOR
Filed Oct. 16, 1933  2 Sheets-Sheet 1
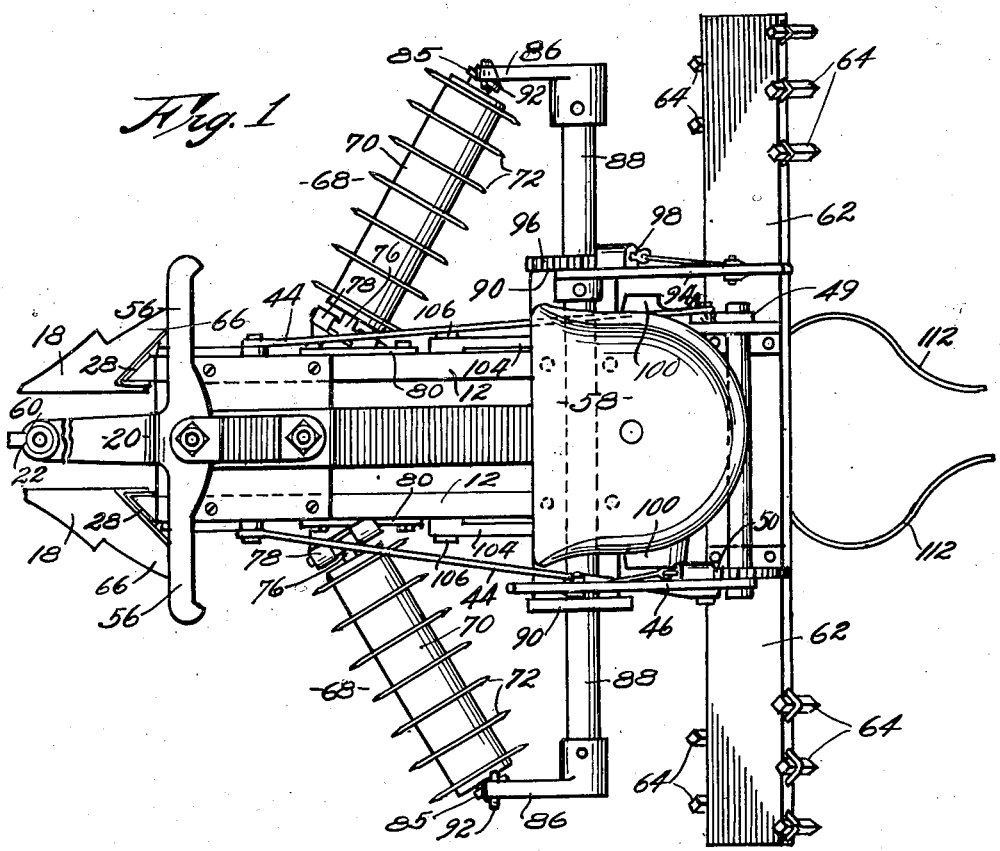
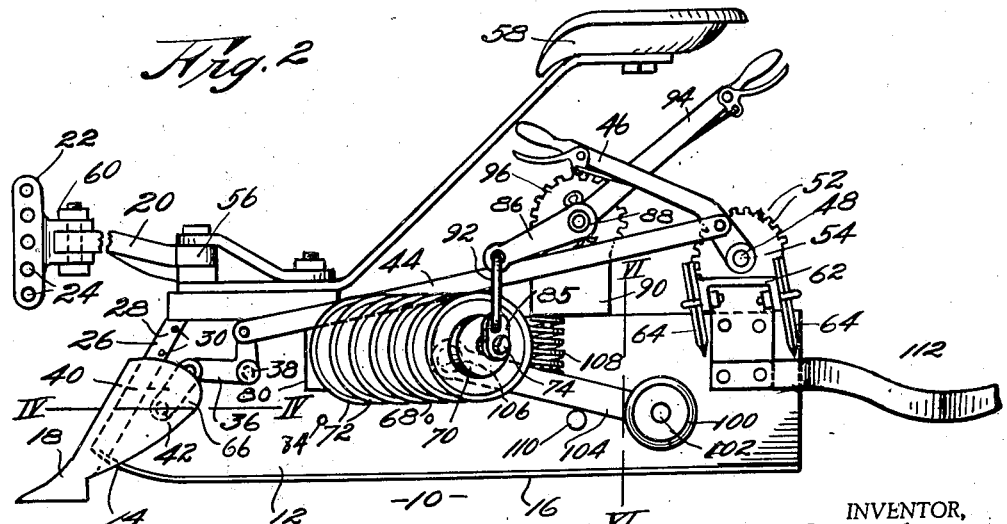
INVENTOR,
Chester C. Dunbar.
BY
Hovey E. Hamilton,
ATTORNEYS.

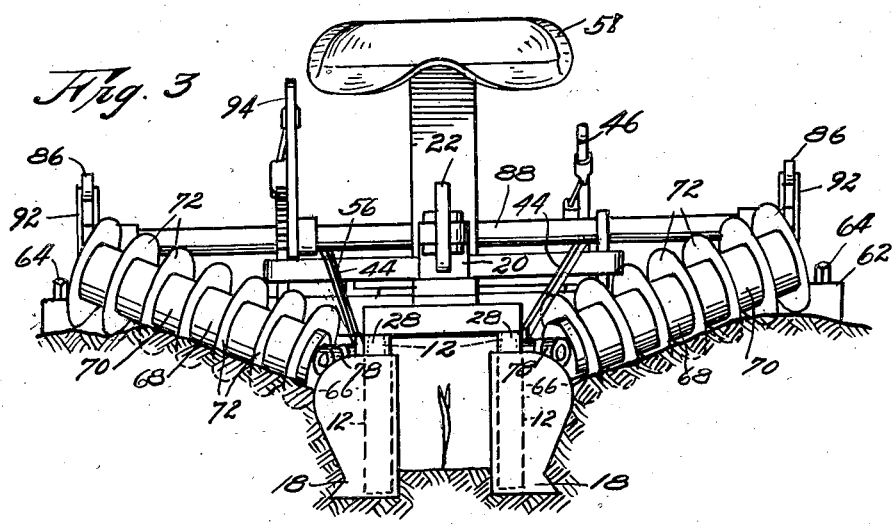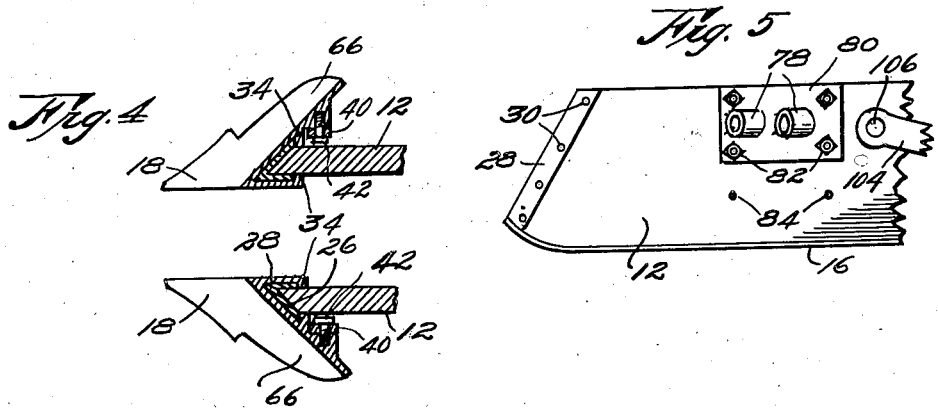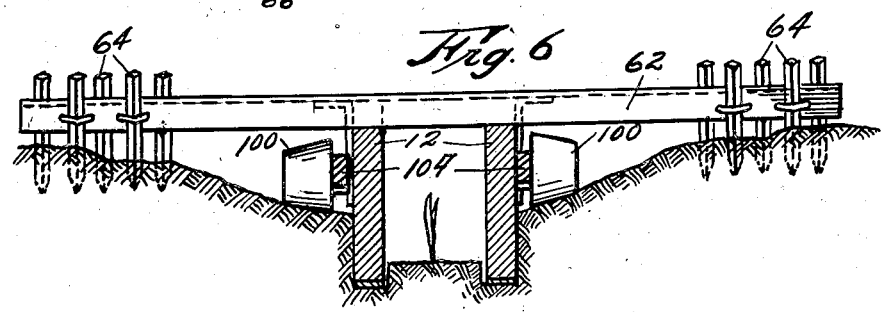

Patented Dec. 4, 1934

1,983,350

UNITED STATES PATENT OFFICE 1,983,350

SLED CULTIVATOR

Chester C. Dunbar, Kansas City, Kans.

Application October 16, 1933, Serial No. 693,854

11 Claims. (Cl. 97—140)

This invention relates to cultivators of the sled type.

The principal object of this invention is the provision of a cultivator having spaced-apart sled runners, each carrying a vertically adjustable plow shear therebefore, whereby a furrow may be formed to allow the associated sled runner to rest on the bottom thereof below the normal surface of the ground being worked and also to serve as subsoilers at opposite sides of the grain row.

Another object of the present invention is the provision of a cultivator provided with spaced-apart sled runners, each having a series of adjustable disks extending outwardly therefrom, said series of disks being so positioned as to cultivate substantially all the ground surface outside the sled runners from center to center between the rows.

A further object is the provision of a sled cultivator having roller means for pulverizing the dirt to be moved adjacent the grain stock being cultivated.

Another object of this invention is the provision of a sled cultivator having stabilizing means that are adjustable to operate to stabilize the sled on different ground surfaces.

A still further object of the invention is the provision of a sled cultivator having subsoiling means associated with each sled runner, and means for moving pulverized dirt towards the grain rows.

Other objects of this invention are the provision of a sled cultivator that is easily operated to follow the grain row, quick adjustability to meet varying ground conditions, and ability to thoroughly stir all the ground between the rows, whereby the weeds are destroyed.

Other objects will appear during the course of the specification, referring to the drawings, wherein:

Figure 1 is a plan view of a sled cultivator embodying the present invention.

Fig. 2 is a side elevation of the sled cultivator.

Fig. 3 is a front elevation of the cultivator shown in operative position in a listed corn row.

Fig. 4 is a fragmentary, sectional view taken on line IV—IV of Fig. 2.

Fig. 5 is a fragmentary view of a front portion of one of the runners, and,

Fig. 6 is a sectional view taken on line VI—VI of Fig. 2.

In the drawings, like reference characters indicate similar parts and the numeral 10 designates a sled having two spaced-apart sled runners 12. These runners are preferably positioned in parallel relation and spaced apart a distance to allow proper cultivating of the corn row which is located therebetween. The front end of each of the runners has an upturned lower front edge 14 which allows the runner to move forwardly without entering the ground. Sled runners as shown are made of wood, thus making it desirable to provide an edging 16 made up of hard material, such as strip metal. Each of the sled runners 12 is provided at its front end with a slidably mounted plow shear or subsoiler 18 which is positioned directly in front of its corresponding sled runner and serves to open up a furrow in which the runner is adapted to travel during the operation of the cultivator. This plow shear may be vertically adjusted so that it will extend below the plane of the bottom of the adjacent runner and also may be adjusted to extend thereabove during the moving of the cultivator when not in active operation.

Plow shear 18, when positioned below the runner 12 as clearly shown in Fig. 2, will open up a furrow having a bottom surface below the normal surface of the ground on which the sled runner rests and as the cultivator is advanced forwardly, it is apparent that the runner will be positioned in the furrow, thus lowering the entire cultivator the depth of the furrow made by the plow shear 18.

After the runner has attained the desired depth, the plow shear 18 is then raised to substantially the same plane as the bottom of the runner, or perhaps slightly therebelow, so that as the cultivator continues to move forwardly, the sled will maintain its vertical position relative to the normal level of the ground being cultivated. The relative depths of the plow shear and the sled runner is dependent to some degree upon the position of the pivotally mounted draft bar 20, to which the team or tractor is hitched for operating the cultivator. It is well known that the higher the hitch between certain limits the greater the tendency of the plow to go deeper into the earth. For the purpose of allowing a variation in the vertical hitch, a clevis 22 is secured to the outer end of draft bar 20 and is provided with a vertical series of holes 24 which serve to receive a clevis for connecting the double-trees to the cultivator.

Plow shear 18 is slidably mounted on its respective runner in the following manner. The forward end of runner 12 is preferably angled forwardly and downwardly at 26 and is provided with an angleiron 28 which is rigidly secured thereto by fastening means 30. Plow shear 18 is provided with a recess 32, into which angleiron 28 is adapted to slidably fit. The overhanging tongues 34 adjacent the opening recess 32 serve to engage the edges of angleiron 28 to securely hold it against longitudinal movement relative to the sled runner. The following mechanism is utilized for adjusting the plow shear to any desired depth and also to hold it in any given position during the plowing operation. A bell crank lever 36, pivotally mounted at 38 on the outer side of sled runner 12, is connected at its outer end to link 40, which in turn is pivotally connected at 42 to plow shear 18. The opposite end of bell crank lever 36 is pivotally connected to operating bar 44, which in turn connects with the hand operating lever 46 in such a manner that when the hand operating lever is oscillating about its axis 48, plow shear 18 will be raised or lowered to maintain the plow shear in a predetermined position. Lever 46 is provided with an adjustable latch 50 which is adapted to engage in notches 52 formed in segment 54. Axis or shaft 48 extends transversely across the sled and is provided at its opposite end with a securely attached lever arm 49, to which is pivotally connected the operating bar 44, whereby the opposite plow is adjusted.

With this construction it is apparent that the operator may easily and quickly vary the depth of the plow shear, thereby controlling the depth that the sled runner is lowered into the ground. When the operator reaches the end of the row being plowed, he simply raises the plow shear 18 out of the ground and above the lower surface of the sled runner, thus permitting the sled to run on the surface of the ground and be turned without exerting any undue stress on the runners.

Plow shear 18 serves as a subsoiler, that is, it breaks the earth below the depth stirred by the lister during the planting operation. This furrow is afterwards filled with loosened soil as hereinafter set forth. It is well known among grain raisers that this subsoiling operation during cultivation adds materially to the condition of the ground and is especially beneficial in semi-arid districts. When the runner 12 is positioned in the furrow as above mentioned, the sled will maintain a more even and direct line of travel due to the fact that it has a prepared level bed on which to travel and the fact that any side wobbling is precluded, due to the side walls of the furrow.

A further provision is made for maintaining the sled in proper relation relative to the corn row by providing transversely extending foot rests 56 which are made integral with draft bar 20 so that the operator who is positioned in seat 58 with his feet resting on members 56 may, by exerting pressure on either of the foot rests, cause the center of hitch 60 to be moved in either direction from the center line of the sled.

Without any material change in the sled construction, two or more sleds may be united to form a multiple row cultivator. Since this arrangement would not involve invention, it is not deemed necessary to make drawings or further specification to disclose this feature.

A transverse channel bar 62 is securely attached to the rear end of sled 10 with its opposite ends extending therebeyond a distance sufficient to overlap the center line between the adjacent rows of corn. Each end of this bar is provided with a series of vertically adjustable harrow teeth 64 which are adapted to engage and pulverize the earth substantially at the center line between the adjacent rows. It is apparent that this sled cultivator is adapted for use not only in listed corn, but also in surface planted corn, and it therefore becomes necessary that the harrow teeth be moved vertically to make it possible to harrow surfaces of varying distances from the bottom of the sled runner.

While harrow teeth have been shown, it is apparent that cultivator shovels or any other means for stirring the earth might be used in their stead.

These two series of harrow teeth which are spaced a considerable distance apart also function as a stabilizer to prevent undue tilting of the cultivator. In listed corn it has been found that the dividing line between the normal surface of the ground before listing which is exposed at each side of the listed furrow is very productive of weed growth, due to the fact that the seeds which have been deposited on the normal surface of the ground are not covered to a depth sufficient to retard their rapid growth.

It is our purpose in producing this cultivator to thoroughly cultivate that portion of the furrow to eliminate any possible weed growth. This is accomplished by extending the mold board 66 of the plow shear 18 outwardly from the outer plane of the adjacent runner a sufficient distance to drag the furrow at this surface line and also to provide a suitable disk member 68 which serves to pulverize the ground to the rear of the plow shear.

This disk member 68 consists of a hingedly mounted cylindrical member 70, having a series of spaced-apart disks 72. Cylindrical member 70 is mounted for free rotation on shaft 74 which is disposed rearwardly and outwardly from the face of sled runner 12. When the sled is moved forwardly and disk 68 is permitted to contact the ground surface, it will be rotated and the disks 72 which are positioned diagonally to the direction of travel of the sled will cultivate all of the surface from the sled runner to a point beyond the center line between the adjacent rows of corn. The action of this disk not only cultivates the soil, but also, due to its angled relation, moves all the dirt toward the sled runner.

Shaft 74 is provided with a T-head 76 which is hingedly mounted in bearings 78, which in turn are integral with plate 80. This plate 80 is secured to the outer side of runner 12 by means of bolts 82. Provision is made for lowering plate 80 on the side of the runner by removing bolts 82 and moving the plate downwardly until the holes therein register with openings 84 formed in runner 12, thus making it possible to contact the surface of the ground with disks 68 when the corn is planted on the level.

As shown in Fig. 3, it is sometimes necessary to raise the outer end of disk 68 so that the angled surface of the listed ridges may be properly cultivated. This is accomplished by means of member 85 which is loosely mounted on shaft 74 and oscillating lever 86 which is rigidly mounted on transverse shaft 88 rotatably mounted in bearings 90, which in turn are carried by sled runners 12. Lever 86 and member 85 are interconnected by means of link 92 which allows for sufficient flexing of the parts. A hand operating lever 94 is rigidly attached to shaft 88 for the purpose of rotating said shaft and oscillating lever 86 to adjust the outer end of disk 68.

A suitable ratchet segment 96 is provided for receiving plunger 98 which is carried by lever 94 to maintain the lever in any desired position. When disk 68 is lowered for use on a plane surface, the outer end of the disk may be lowered by simply oscillating lever 94. It should be noted that both of the hand operating levers 46 and 94 serve to control their respective elements at both sides of the sled.

The earth which has been cultivated and moved adjacent the sled runner is intended to be moved adjacent the corn row when the cultivation is completed, and it is therefore essential that the clods be crushed which might be detrimental to the tender corn stocks. For this purpose pulverizing rollers 100 are mounted for oscillatory movement at the outer side of sled runner 12. These rollers are preferably frusto-conical in shape and are mounted on axle 102 which is securely affixed to the free end of lever 104, which in turn is pivoted at 106 to the side wall of the runner. For the purpose of exerting a downward pressure on roller 100 sufficient to properly pulverize the clods, a compression spring 108 is positioned between lever 104 and bearing member 90. This spring is normally under tension when lever 104 is at its lowest position as indicated in Fig. 2.

Stop pin 110 serves to maintain roller 100 above the lower edge of the sled runner which is necessary during the transporting of the cultivator to and from the field. This roller is adapted to raise and lower against the action of compression spring 108 so as to follow the contour of the surface being rolled. Securely attached at the rearward end of each of the runners is a blade 112 which is formed to extend outwardly from the runner and also to have its inner portion inwardly inclined sufficiently to drag the pulverized dirt into the furrow made by plow 18 and also about the corn stocks. This blade is adapted to be adjusted to meet the varying conditions that may arise in different soils and different depths of listing.

It is apparent that I have produced a sled cultivator which is adapted for use in listed or surface planted grains which will subsoil the earth at both sides of the grain row and will also thoroughly cultivate all portions of the earth between adjacent rows.

What I claim is:

1. A sled cultivator comprising a sled having a pair of spaced-apart sled runners; a plow shear slidably mounted on the forward end and in front of each of said runners and extending outwardly from the sides thereof; and means, manually operable, to adjust said plows relative to their respective runners.

2. A sled cultivator comprising a sled having spaced-apart sled runners; a plow shear mounted for vertical adjustment in front of each sled runner; an adjustably mounted disk member carried by each of said sled runners and extending outwardly therefrom with the inner portions thereof positioned in the path of travel of their respective plow shears; and manually operable means for adjusting said disk members.

3. A sled cultivator comprising a sled having spaced-apart sled runners; a plow shear mounted for vertical adjustment in front of each sled runner and extending outwardly therefrom; an adjustably mounted disk member carried by each of said sled runners and extending outwardly and rearwardly therefrom with the inner portion of each disk member positioned in the path of travel of its adjacent plow shear; and means operable to raise and lower the outer ends of said disk members.

4. A sled cultivator comprising a sled having spaced-apart sled runners; a plow shear mounted for vertical adjustment in front of each sled runner and adapted to move the soil away from said runners; an adjustably mounted disk member carried by each of said sled runners to extend outwardly and rearwardly therefrom and adapted for vertical adjustment at their inner ends, said disk members being adapted to carry the soil moved by said disks back toward said sled runners; and means for raising and lowering the outer ends of said disk members.

5. A sled cultivator comprising a sled having spaced-apart sled runners; a plow shear mounted for vertical adjustment in front of each sled runner and extending outwardly therefrom; and series of harrow teeth carried by said sled runners positioned in spaced-apart relation beyond the opposite sides of the said plow shears.

6. A sled cultivator comprising a sled having a pair of spaced-apart sled runners; a plow shear mounted for vertical adjustment in front of each of said runners with portions thereof extending outwardly beyond said sled runners; a series of harrow teeth carried by said sled and positioned beyond the opposite sides of said plow shears; and an adjustably mounted disk member carried at each side of said sled intermediate said plow and said harrow teeth and completely covering the space therebetween when the cultivator is in operation.

7. A sled cultivator comprising a sled having a pair of spaced-apart sled runners; a plow member carried by each sled runner operable to form a furrow to receive its respective sled runner and to move the earth outwardly from said sled runners; means for moving earth toward and against the outside of said runners; and means to pulverize said moved earth.

8. A sled cultivator comprising a sled having a pair of spaced-apart sled runners; a plow member carried by each sled runner operable to form a furrow to receive its respective sled runner and to move the earth outwardly from said sled runners; means for moving said moved earth toward the outside of said runners; means to pulverize said moved earth; and means to move said moved and pulverized earth into and between the furrows formed by said plows.

9. A sled cultivator comprising a sled having spaced-apart sled runners; a plow member positioned in front of each sled runner adapted for vertical adjustment above and below the plane of the lower edges of said sled runners and having a portion thereof extending outwardly beyond the adjacent sled runner; means for maintaining said plows in a predetermined vertical position relative to said plane; means for stirring and pulverizing the earth deposited at the opposite sides of said sled by said plow shears; and means carried by the sled to move a portion of said earth into the area traversed by the sled.

10. A sled cultivator comprising a sled having spaced-apart sled runners; a plow member positioned in front of each of said sled runners and adapted to force the earth outwardly from the adjacent sled runner; means for raising and lowering said plow members above and below the plane of the lower edges of said sled runners; means positioned in the path of said plow furrow for pulverizing said plowed earth; and means for moving said pulverized earth into the area traversed by the sled.

11. A sled cultivator comprising a sled having spaced-apart sled runners; adjustable plow members carried in front of each of said sled runners and extending outwardly therefrom; means for cultivating the earth at the opposite sides of said sled; a draft bar pivotally mounted on said sled; and manually controlled means operable to move the outer end of said draft bar transversely of said sled.

CHESTER C. DUNBAR.